(12) United States Patent
Jadhav et al.

(10) Patent No.: US 9,156,387 B2
(45) Date of Patent: Oct. 13, 2015

(54) COUPLING STRUCTURE FOR PULL-CUP AND ARMREST ASSEMBLY

(71) Applicant: FORD GLOBAL TECHNOLOGIES, LLC, Dearborn, MI (US)

(72) Inventors: Nitesh Chandrakant Jadhav, Canton, MI (US); Mirza Safder Baig, Canton, MI (US); Krishnakanth E. Aekbote, Farmington Hills, MI (US); Linh Doan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/181,833

(22) Filed: Feb. 17, 2014

(65) Prior Publication Data

US 2015/0231999 A1    Aug. 20, 2015

(51) Int. Cl.
*B60N 2/46* (2006.01)
*B60R 13/02* (2006.01)

(52) U.S. Cl.
CPC ............ *B60N 2/466* (2013.01); *B60R 13/0243* (2013.01); *B60R 2013/0287* (2013.01)

(58) Field of Classification Search
CPC ........ B60N 2/46; B60N 2/4606; B60N 2/462; B60N 2/466; B60N 2/464; B60N 2/4653; B60R 13/0243; B60R 13/0287
USPC ................... 296/1.09, 187.12, 153
See application file for complete search history.

(56) References Cited

U.S. PATENT DOCUMENTS

| | | | | |
|---|---|---|---|---|
| 3,387,881 | A * | 6/1968 | Stepanek et al. | 296/153 |
| 3,620,566 | A * | 11/1971 | Leconte | 296/153 |
| 4,226,464 | A * | 10/1980 | Janz et al. | 296/153 |
| 4,667,979 | A * | 5/1987 | Wolff | 280/752 |
| 5,005,895 | A * | 4/1991 | Muyres et al. | 296/97.8 |
| 6,391,232 | B1 * | 5/2002 | Fritsch | 264/46.6 |
| 7,055,888 | B2 * | 6/2006 | Reed et al. | 296/153 |
| 7,226,113 | B2 * | 6/2007 | Dreier et al. | 296/153 |
| 7,445,270 | B2 * | 11/2008 | Wakou et al. | 296/187.05 |
| 7,458,604 | B2 * | 12/2008 | Hier et al. | 280/728.3 |
| 7,458,631 | B2 * | 12/2008 | Cowelchuk et al. | 296/153 |
| 7,478,854 | B2 * | 1/2009 | Cowelchuk et al. | 296/1.02 |
| 7,661,751 | B2 | 2/2010 | Gokhale et al. | |
| 7,762,600 | B2 * | 7/2010 | Shiono et al. | 296/1.02 |
| 7,789,455 | B2 | 9/2010 | Hall et al. | |
| 7,871,119 | B2 * | 1/2011 | Schoemann et al. | 296/146.7 |
| 8,403,398 | B2 * | 3/2013 | Schulz | 296/146.1 |
| 2007/0108830 | A1 | 5/2007 | Hessler et al. | |

* cited by examiner

*Primary Examiner* — Gregory Blankenship
(74) *Attorney, Agent, or Firm* — Frank MacKenzie; Price Heneveld LLP

(57) ABSTRACT

A door trim assembly includes an armrest, a pull-cup unit, and an attachment structure. The attachment structure has a first portion with a first flange, a second portion with two second flanges on opposing sides of the first flange, and an attachment member engaged with the at least one first flange and the at least two second flanges. The first and second portions are respectively coupled to one each of the armrest and the pull-cup unit, which may prevent separation during and after a crash event.

20 Claims, 5 Drawing Sheets

COUPLING STRUCTURE FOR PULL-CUP AND ARMREST ASSEMBLY

FIELD OF THE INVENTION

The present invention relates generally to a coupling structure for a two-part door trim assembly unit having armrest and pull-cup units, the coupling structure including a set of fins or flanges overlapping one another and connecting with one of the armrest unit and the pull-cup unit in an alternating fashion.

BACKGROUND OF THE INVENTION

Generally, car door interiors include a door trim assembly in the form of an interior substrate with an armrest affixed thereto. The armrest of the door trim assembly may provide a padded ledge, on which a passenger may position an arm. Commonly, an armrest extends to a portion that may include a "pull-cup," which may generally be an opening or cavity in the armrest intended to be used by a driver or passenger to pull the car door closed from the interior of the car.

Some door trim assemblies include an armrest having a two-piece construction in which the armrest itself is provided as one unit and the pull-cup (and, optionally, other features) is provided in another unit that is attached to and extends from the armrest unit. In other configurations, the armrest and pull-cup can be included in a single one-piece construction where both features are integrated into a single unit that can sometimes span close to the entire length of a door's interior. While two-part configurations may be desirable for reasons including cost, assembly, or appearance, two-part assemblies may separate along the junction between units as a result of deformation of the overall door assembly resulting from a real-world or simulated test crash.

It is desirable to provide a robust coupling that is useable in a two-part armrest and pull-cup assembly having to reduce separation between the two units during a crash, post-crash, or other event.

SUMMARY OF THE INVENTION

According to one aspect of the present invention, a door trim assembly includes an armrest, a pull-cup unit, and a coupling structure. The coupling structure has a first portion with a first fin, a second portion with two second fins on opposing sides of the first fin, and an attachment member engaged with the at least one first fin and the at least two second fins. The first and second portions are respectively affixed with one each of the armrest and the pull-cup unit.

According to another aspect of the present invention, a vehicle door includes a door interior substrate, an armrest, and a pull-cup unit. The armrest has a body extending in a first direction away from the door interior substrate and in a second direction along the door interior substrate and a first coupling structure portion affixed with the body. The pull-cup unit has a body extending generally in the first and second directions and a second coupling structure portion affixed with the body. The vehicle door further includes an attachment member extending in a third direction perpendicular to the first and second directions so as to couple the first coupling structure portion with the second coupling structure portion.

According to another aspect of the present invention, a vehicle door component assembly includes first and second bodies, each having an inboard face and an outboard face with at least one attachment feature thereon. The first body and the second body define a junction therebetween. The assembly further includes a coupling structure affixed between the first and second bodies and defining a pivot axis within the junction and adjacent to the outboard faces of the first and second bodies. The coupling structure joins the first and second bodies to one another so as to be rotatable toward and away from each other about the pivot axis.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
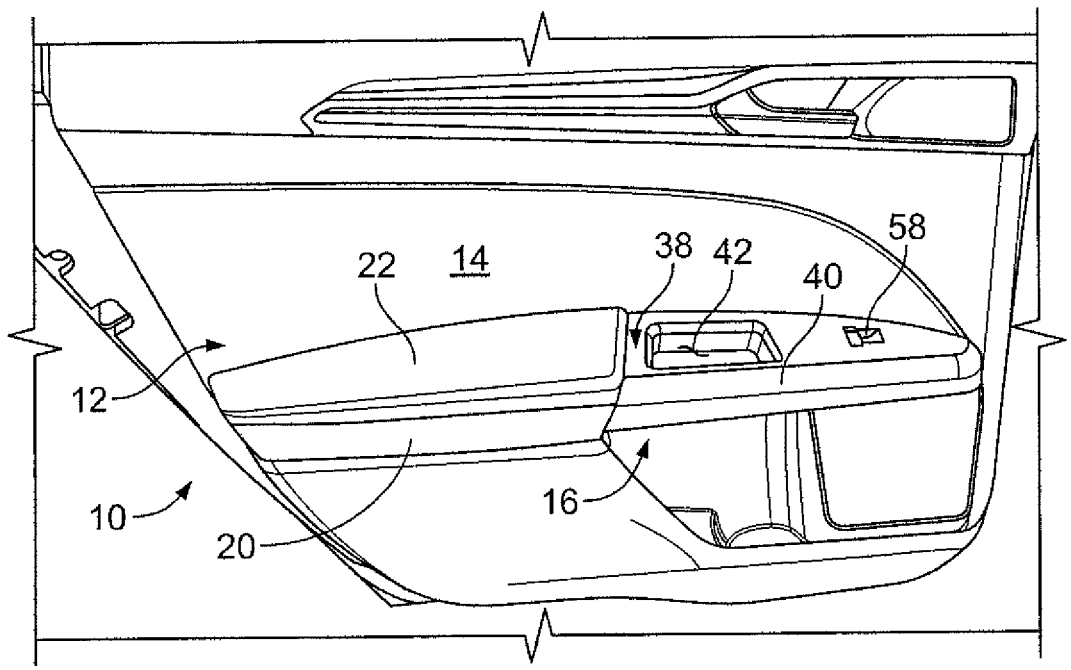
FIG. 1 is a fragmentary perspective view of an interior of a car door assembly.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations.

Figure 5:
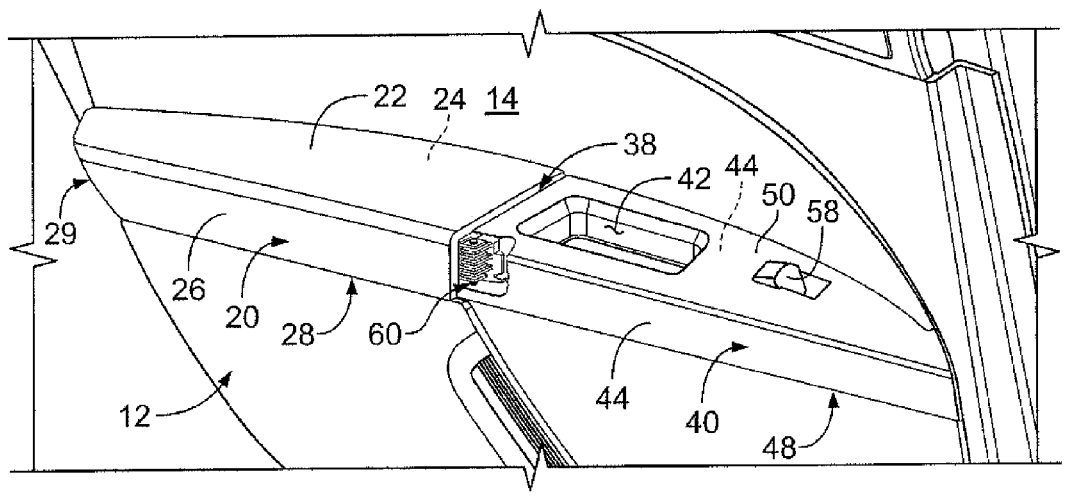
FIG. 5 is a cutaway perspective view of an interior of a car door assembly showing a coupling structure according to an embodiment of the present invention.

Referring now to FIG. 1, reference numeral 10 generally designates a car door assembly, which is illustrated as a generic door assembly for exemplary purposes. Car door assembly 10 includes a door trim assembly 12 in the form of an interior substrate 14 with an armrest and pull-cup assembly 16 affixed thereto. Examples of interior substrates 14 of door trim assemblies 12 can line the interior of the car door assembly 10 and can provide a comfortable, finished appearance and feel, and can further conceal the internal components (not shown) of door assembly 10 from view. Interior substrate 14, as shown in FIG. 5, may be generally affixed on the side of the door assembly 10 positioned toward the interior of the car to which door assembly 10 is attached and may further be positioned opposite the exterior door panel 18 (not shown in FIG. 1). Additionally, the interior substrate 14 may include or have attached thereto, other elements or sub-assemblies, such as map pockets, speaker grilles, door handle trim or bezels and the like, which can provide function, aesthetics, or both.

Armrest and pull-cup assembly 16 includes an armrest unit 20, which may provide a generally horizontal upper surface 22 or ledge on which a passenger may position a portion of an arm, as may be desired for purposes of driver or passenger comfort or ergonomics. Pull-cup unit 40 may be affixed with armrest unit 20 in the armrest and pull-cup assembly 16 that can be configured as a two-part assembly having an armrest unit 20 and a pull-cup unit 40. Pull-cup unit 40 may be affixed with armrest unit 20 in the armrest and pull-cup assembly 16. Pull-cup unit 40 can include a "pull-cup" 42, which can take on many forms but may generally be characterized as an opening or cavity intended to be used by a driver or passenger to pull the car door closed from the interior of the car. It is noted that pull-cup unit 40 may generally be regarded as a unit of a two-part or multi-part door trim assembly or sub-assembly that includes or otherwise defines a pull feature for the door. Pull-cup unit can also include additional interior car features thereon, including window controls 58, door lock controls or the like. In door trim assemblies, such as door trim assembly 12 of FIG. 1, both the armrest unit 20 and the pull-cup unit 40 have be attached to the door interior substrate 14 using adhesives, heat stakes, or other mechanical fasteners such as screws or the like that are generally considered attachment features positioned on or otherwise available at a surface thereof facing the door interior substrate 14 (the "outboard" face of the unit with respect to the interior of the car). In other configurations, it may be possible to attach armrest unit 20 and pull-cup assembly 40 to other internal components of the door assembly 10 through substrate 14 using similar attachment features. Further, the armrest unit 20 and the pull-cup assembly 40 may also be attached together.

Figure 2:
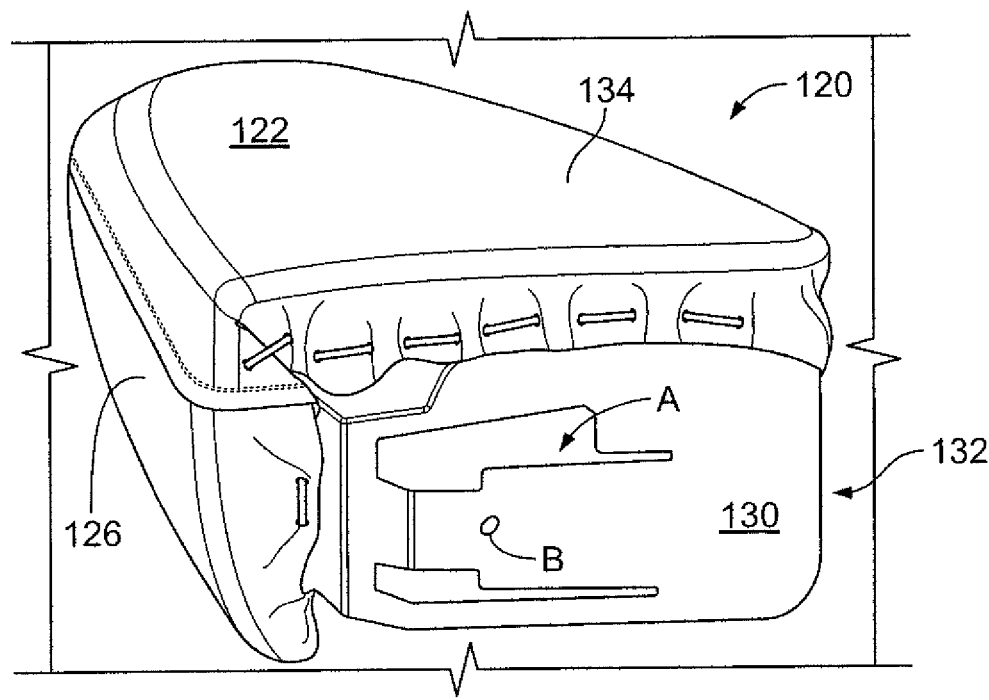
FIG. 2 is a fragmentary perspective view of a portion of a prior art coupling between portions of a door trim assembly such as the assembly of FIG. 1.

In FIG. 2, a prior-art variation of an armrest unit 120 is shown having a portion of a coupling A thereon. Coupling A includes, by way of example, a hole formed in a face 130 of armrest unit 120, wherein face 130 is configured to abut a mating face of pull-cup unit 140. In the prior-art coupling A, a screw or other mechanical fastener is assembled through a portion of the pull-cup unit 140 (which can be done through an interior surface of pull-cup 142 or another feature of pull-cup unit 140. The screw or other fastener (not shown) is then threaded into or otherwise engaged with the hole B in the portion of the coupling A disposed on armrest unit 120.

Figure 3:
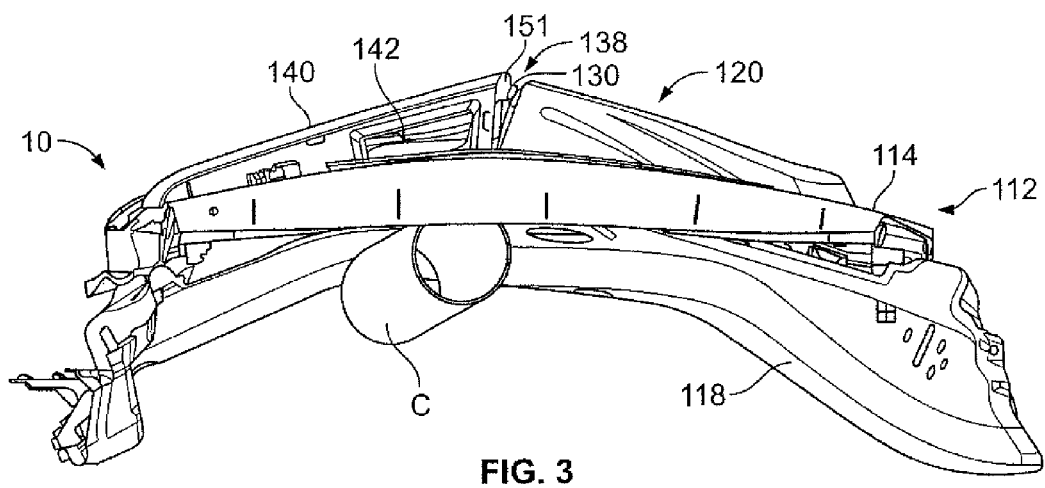
FIG. 3 is a fragmentary perspective view of a car door trim assembly, including a prior art coupling of FIG. 2, in a deformed state after impact with an object.

Prior art couplings such as coupling A shown in FIG. 2, have been generally configured to draw the armrest unit 120 and the pull-cup unit 140 together such that, when incorporated into the finished door assembly 110, there is no visible gap at the junction 138 between units 120 and 140, and so as to give the armrest and pull-cup assembly 116 a unitary feel and appearance to vehicle passengers. However, such couplings A may not be robust enough to withstand deformation of door assembly 110, such as that which can arise from an impact with another object during an actual or simulated crash. In the example shown in FIG. 3, a car door assembly 110' is shown in a deformed state to illustrate how an impact with an object C can cause a deformation of the door assembly 110 that includes a separation of the armrest unit 120 and the pull-cup unit 140 in the area of junction 138. In the example of FIG. 3, object C is shown to have impacted door assembly 110 on an exterior thereof, in a location along door panel 118 that is aligned with a portion of armrest and pull-cup assembly 116 and, more particularly, along a portion of pull-cup unit 140 adjacent the junction 138 with armrest unit 120. Such an impact and corresponding deformation can, for example, cause junction 138 to expand to a gap 138' in which the edges of both armrest unit 120 and pull-cup unit 140 that bound the abutting faces 130 and 151, thereof. Because the fasteners used in such prior art couplings A are assembled in the direction of separation between the armrest unit 120 and the pull-cup unit 140 (e.g., in a direction between the front and back of the associated car), the coupling A is particularly vulnerable to failure (e.g., by stripping of threads within hole B when an axial force is applied to an associated screw).

Figure 4:
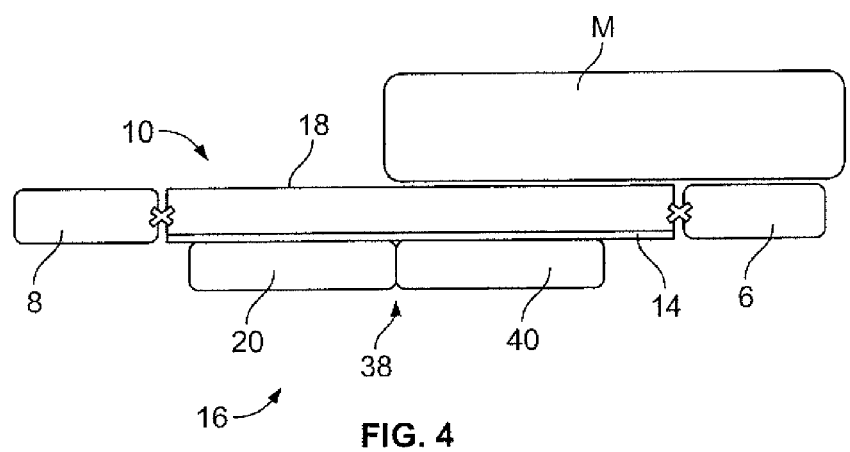
FIG. 4 is a schematic view of a portion of a car, including a door trim assembly, during simulated crash test conditions.

Various governing bodies have introduced standards that require a car and its components to meet certain performance benchmarks in response to a crash. Such governing bodies test compliance with these standards by requiring cars to be subjected to various crash tests and subsequent performance evaluation. By way of example, a schematic depiction of various components involved in the European ECE-95 Side Impact test is illustrated in FIG. 4, in which a moving deformable barrier M ("MDB") of a specified weight impacts a target vehicle at a specified speed in a lateral direction. Depending on the wheel base of the target vehicle, the rear edge of the MDB may align with the middle part of the door assembly 10, illustrated as a rear car door, at a close proximity to armrest unit 20 and pull-cup unit 40 junction 38. The accompanying ECE-95 requirement states that "no interior device or component shall become detached in such a way as noticeably to increase the risk of injury to the occupant from sharp projections or jagged edges." Effectively, this requirement implies that there should be no separation of armrest and pull-cup assembly of a door-trim, post-crash. It would further be understood that an armrest and pull-cup assembly in which the armrest unit and pull-cup unit are maintained together at the junction therebetween both during and after a crash may be safer to those in the car than one in which the components separate.

As shown in FIG. 5, a coupling 60 according to an embodiment of the present invention is illustrated in connection with a door assembly 10 having a door trim assembly 12 on an interior thereof. Coupling 60 is configured to reduce the formation of a gap within the junction 38 between armrest unit 20 and pull-cup unit 40 during a crash or the like and to maintain surfaces 30 and 51 in a generally flush relationship therebetween. Door trim assembly 12 is depicted as including a door interior substrate 14, and an armrest and pull-cup assembly 16 in a two-part configuration, as discussed above. In the example of FIG. 5, armrest unit 20 can include a structural member 32 made of a generally rigid material that gives shape to armrest unit 20 and provides functional structure therefor. A cover 34 is positioned over structural member 32 and faces the interior of the car so as to define surfaces 22, 26, 28, and 29 of the armrest unit 20. Cover 34 can be of a number of different materials, such as foam-lined leather or imitation leather, soft-touch polymer material, plastic, or the like, and can include a plurality of separate portions of the same or different materials affixed to each other and/or to structural member 32. Cover 34 can also be structured so that outer face 24 (or an "outboard" face with respect to the interior of the car) and a junction face 30 are left wholly or partially open to facilitate attachment with adjacent components, as described elsewhere.

In a manner similar to that of armrest unit 20, pull-cup unit 40 can include a structural member 52 made of a generally rigid material, such as metal, various plastics, resins or the like, configured to provide a general shape for pull-cup unit 40 and to give pull-cup unit 40 structural support, including for example, the support to define the structure and provide the functionality for pull-cup 42. Pull-cup unit 40 can include one or more covers over structural member 52 such as covers 54 and 56, as depicted in FIG. 5. Such covers 54,56 can be of generally hard materials such as plastic, wood, or the like (including combinations of materials), and can be used, for example, in the area of pull-cup 42 or controls 58 to provide additional support or tactile qualities therefor, such as for cover 56. Additionally, one or more of such covers, e.g. cover 54, can be of fabric, leather, or a soft-touch material, such as those described above.

Figure 6:
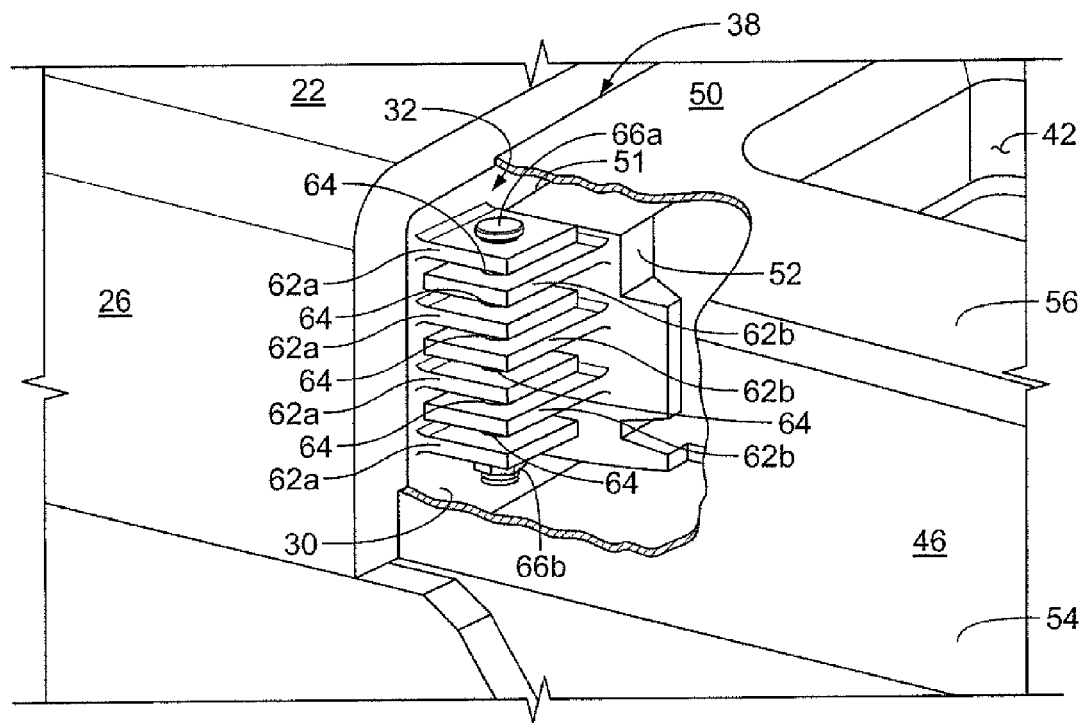
FIG. 6 is a detail view of the coupling structure shown in FIG. 5.

In FIG. 6, coupling structure 60 is shown in detail. Coupling structure 60 includes a number of flanges or fins 62, each having a respective hole 64 therethrough. The fins 62 are positionable within coupling structure 60, as will be further described below, in an overlapping fashion such that the holes 64 at least partially align with one another. An attachment member 66 passes through the aligned holes and is secured, as dictated by the structure of the particular type of attachment member 66 used, within coupling structure 60. To facilitate the joining of armrest unit 20 to pull-cup unit 40 by coupling structure 60, each of the fins is attached to one of either the armrest unit 20 or the pull-cup unit 40. As shown in FIG. 5, a first group of fins 62a can be attached with armrest unit 20 and a second group of fins 62b can be attached with pull-cup unit 40 in separate portions of coupling structure 60. In this manner, by securing attachment member 66 through the respective holes 64 of fins 62a and 62b, a connection or joint between armrest unit 20 and pull-cup unit 40 may be achieved.

Figure 7:
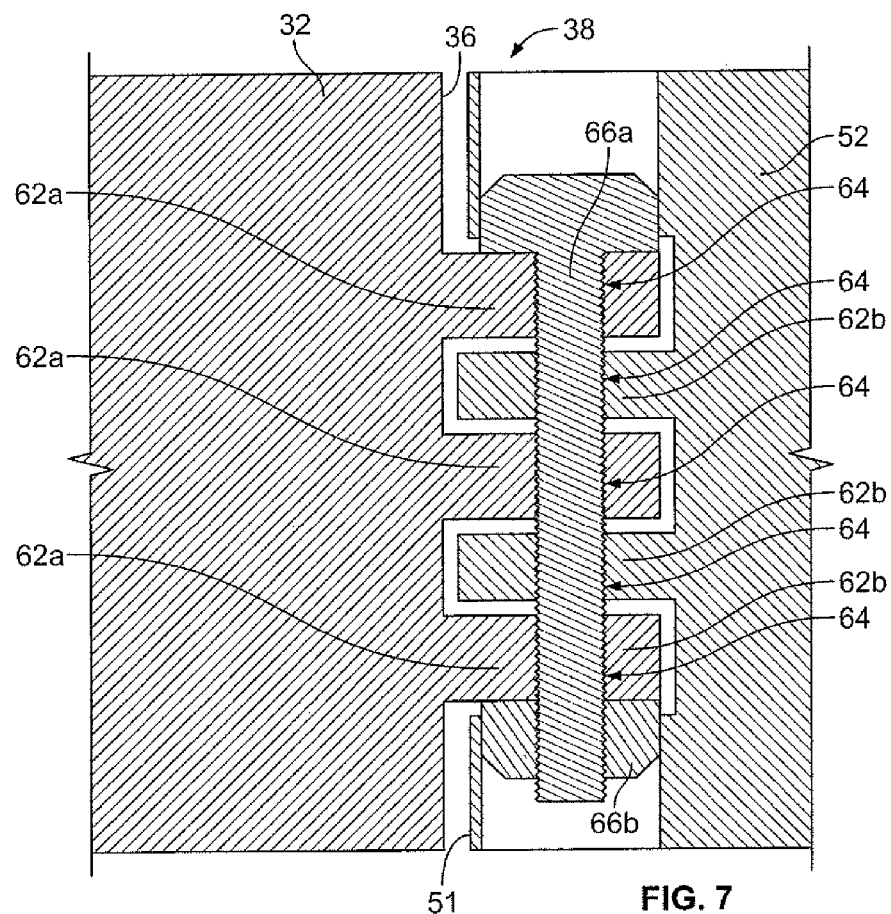
FIG. 7 is a schematic side view of portions of the coupling structure of FIG. 5.

As shown in FIG. 7, fins 62a can be arranged to overlap with fins 62b in an alternating fashion. In this arrangement adjacent ones of fins 62b, for example, can be spaced apart so as to receive one of fins 62a therebetween. Adjacent ones of fins 62a can also be arranged in a similar manner to receive one of fins 62b therebetween. This arrangement can be repeated in configurations of coupling 60 with, for example, more than three fins 62, such as the example of FIG. 7, in which coupling 60 includes three of fins 62a and two of fins 62b configured in an overlapping manner, as just described, or in FIG. 5, in which coupling structure 60 includes four of fins 62a and three of fins 62b. The particular number of fins 62 and the allocation of such fins among those fins 62a attached with armrest unit 20 and those fins 62b attached with pull-cup unit 40 can vary and can be determined based on a number of factors, including spatial requirements due to the design of the related components and assemblies, the materials used for the fins 62 and the components with which they are attached, the configuration of attachment member 66, the thickness of fins 62, and the like.

In one example, coupling 60 can include as few as two fins 62b with a single fin 62a attached to each of the armrest unit 20 and the pull-cup unit 40 (in another example coupling 60 can include two of fins 62a and a single fin 62b). However, an arrangement in which the outermost ones of fins 62 are attached to the same unit (i.e. either the armrest unit 20 or the pull-cup unit 40) may reduce torsional shear forces generated within coupling 62 that may be applied to attachment member 66 and or to fins 62 themselves. Such an arrangement is as shown in FIGS. 5 and 7 in which the overlapping and alternating relationship of the fins 62a and 62b is such that two of the fins 62a are the outermost fins 62 in coupling 60 (i.e. such fins only have another fin to one side thereof). Such an arrangement can be accomplished with any odd number of total fins 62, such as three or more. Further, the outermost ones of fins 62 can be affixed with either of armrest unit 20 or pull-cup unit 40, as desired, for example, due to particular structural, assembly, design or like requirements.

As discussed, the general configuration of fins 62 in coupling 60 can allow for variation thereof according to a number of factors, including the number and spacing of the fins 62. Further, the thickness T of the fins 62 can also be varied to provide a desired level of strength for the individual fins 62 and for the coupling 60 as a whole. The desired level of strength achieved based on the thickness of the fins 62 can vary according to a number of factors, including the number of fins 62 included in coupling 60, as well as the material of which the fins 62 are formed. Fins 62 can be made of a number of different materials, including aluminum, steel, magnesium, various alloys, or the like, and further including various polymeric materials such as plastics (ABS, polycarbonate, polyethylene, nylon, etc.) or resins such as urethane or the like.

In an example, fins 62 can be integrally formed with the respective structural members 32 and 52 of the armrest unit 20 and the pull-cup unit 40 to achieve affixation therebetween. In such an embodiment, the fins 62 can be of the same material as the associated structural member 32,52 and can be formed as a portion thereof by appropriate processes (e.g., molding in the case of plastic or resin structural members or machining, casting, forging, or combinations thereof in the case of metal structural members 32,52). In other examples, the fins 62 can be formed as separate elements from the structural members 32,52 and can be otherwise affixed thereto. By way of example, fins 62a can be of plastic, metal, fiberglass, or the like and can be permanently assembled with structural member 32 by an insert injection molding process in which the structural member is molded around a portion of fins 62a (such as a rib or additional hole therein or an element connecting fins 62a together). In another example, fins 62a can, either individually or as an assembly thereof, be affixed to structural member 32 by adhesives or another mechanical fastener. Fins 62b can be affixed with structural member 52 in similar manners.

As shown in FIGS. 5-7, fins 62 are configured such that their respective holes 64 align to receive attachment member 66 in a generally vertical direction, that is, in a direction that is generally parallel with the plane defined by the door interior substrate 14 and perpendicular to the direction along which the armrest and pull-cup unit 40 extends with respect to the door interior substrate 14. In such an arrangement, the coupling structure 60 can be further configured to permit some rotational movement between the armrest unit 20 and the pull-cup unit 40 along a horizontal plane perpendicular to the door interior substrate 14.

Figure 8:
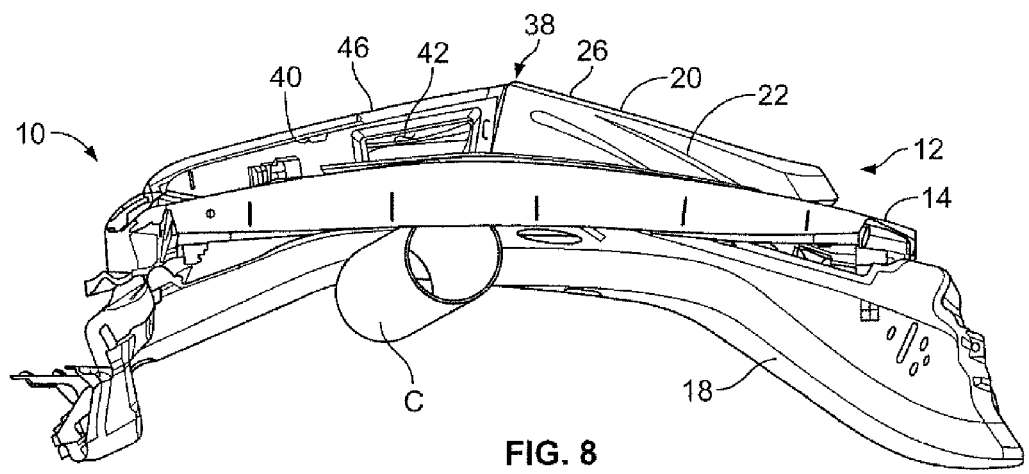
FIG. 8 is a fragmentary perspective view of the car door trim assembly including a coupling structure according to an embodiment of the present invention, in a deformed state after impact with an object.

As can be seen in FIG. 8, an impact of an example object C with the exterior of door assembly 10 and, in particular, against door panel 18, any space between door panel 18 and the door interior substrate 14 becomes partially closed. The presence of the door beams, flutter braces, window rails, a window motor, and the like (not shown) inside the door assembly 10 can lead to a stack-up inside of door assembly 10 that can cause deformation of the interior substrate 14, even in moderate impacts. In an impact of an object C at a location at least similar to that shown in FIG. 8, the armrest unit 20 and pull-cup unit 40 are urged in a direction such that they rotate relative to each other generally about the axis of attachment member 66. By configuring coupling structure 60 as such, the rotation between the armrest unit 20 and the pull-cup unit 40 that can occur from an impact against door panel 18 in the vicinity of junction 38 does not rotationally stress coupling 60. The lack of such stress removes at least one potential failure mode from coupling 60, which may result in a more robust overall configuration. Further, the rotation permitted between armrest unit 20 and pull-cup unit 40 can prevent stress leading to plastic deformation that could occur in a rigid coupling. Such plastic deformation could impede any springback within elastically deformed portions of door assembly 10 post-crash. Further the torsional stiffness of attachment member 66 and any elastic deformation of fins 62 that may occur may facilitate such spring-back of door assembly 10.

Figure 9:
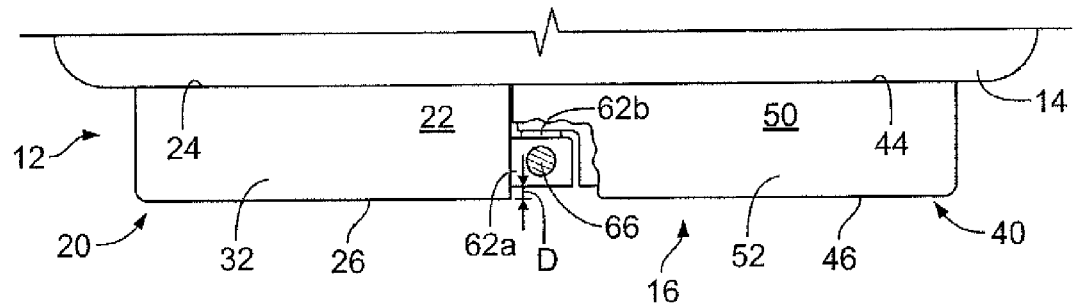
FIG. 9 is a schematic plan view of portions of the armrest pull-cup assembly of FIG. 5.

To further contribute to a reduction in separation between the armrest unit 20 and the pull-cup unit 40 in the location of junction 38, coupling 60 can be configured to position attachment member 66 as far away from the door interior substrate 14 as permitted by the structure of the related components. As shown in FIG. 9, attachment member 66 can be positioned within coupling 60 in a position adjacent the inner surface 26 (or "inboard surface" with respect to the interior of the car) of armrest unit 20 and adjacent inner surface 46 of pull-cup unit 40. It is noted that some armrest unit or pull-cup unit structures may not have clearly defined separations between surfaces (e.g. lower and inside), but as referred to herein, an inside surface of either such structure can be considered to be an area surrounding the innermost portion of the armrest or pull-cup units. By way of example, a coupling structure 60 between armrest unit 20 and pull-cup unit 40 can be configured such that attachment member 66 is at least closer to inner surfaces 26 and 46 than it is to outer surfaces 24 and 44. In another example, to further the ability of coupling 60 to prevent separation between armrest unit 20 and pull-cup unit 40, attachment member 66 can be positioned toward inner surfaces 26 and 46 (which can also be referred to as "inboard" surfaces with respect to the interior of the car) through at least 75% of the total distance between outer surfaces 24 and 44 and inner surfaces 26 and 46. In yet another example, attachment member 66 can be positioned toward inner surfaces 26 and 46 through between 60% and 95% of the total distance between outer surfaces 24 and 44 and inner surfaces 26 and 46.

At least for aesthetic considerations, it may be preferable for coupling 60 to be concealed within junction 38 by the adjacent portions of armrest unit 20 and pull-cup unit 40, which may require fins 62 to be set back somewhat from inner surfaces 26 and 46 at a distance D. Such a setback distance D can be sufficient to allow armrest unit 20 and pull-cup unit 40 to abut one another in the area of junction 38 along inner surfaces 26 and 46 such that coupling structure 60 and its components are concealed from view and such that any edges of, for example, covers 34 and 54 in such area are also concealed from view. In an example coupling structure 60 can be configured such that portions of fins 62 closest to inner surfaces 26 and 46 are set back from the closest of such surfaces 26 and 46 by distance D of between 5 mm and 20 mm.

By configuration of coupling structure 60 as described above, separation of armrest unit 20 and pull-cup unit 40 can be prevented or reduced, compared to assemblies using prior art couplings, during plastic deformation of door assembly 10 and its other components during a simulated or real-world impact, as shown in FIG. 8. Further, coupling 60 can substantially maintain its structural integrity while allowing rotation between armrest unit 20 and pull-cup unit 40. This can keep the edges of armrest unit 20 and pull-cup unit 40 close enough together in the area of junction 38 to increase safety of passengers or a driver and to comply with, for example, the ECE-95 Side Impact test requirements discussed above or other similar tests and requirements. It is noted that such rotation may be facilitated by corresponding deformation of portions of armrest unit 20 and/or pull-cup unit 40 in the areas adjacent junction 38 and inboard of coupling 60, as can be seen in FIG. 8.

Attachment member 66 can be any type of structure of sufficient strength to maintain the structure of coupling 60 during vehicle assembly, day-to-day use, and during impacts, such as those examples described above. Attachment member 66 is illustrated in FIGS. 5-7 as a combination of a bolt 66*a*, fitted through holes 64 of fins 62, and a nut 66*b* threaded on the end of bolt 66*a*. In another example, the particular one of fins 62 opposite the head of bolt 66*a* can be internally threaded such that bolt 66*a* can be threadibly engaged therewith without the use of a nut 66*b*. In another example a plastic or metal tether strip can be used and can be assembled with a portion thereof passing through holes 64 and another portion being secured along an outside edge of fins 62. Such an attachment member 66 can be useful wherein various structural considerations of armrest unit 20 and pull-cup unit 40 result in holes 64 not being completely aligned.

Figure 10:
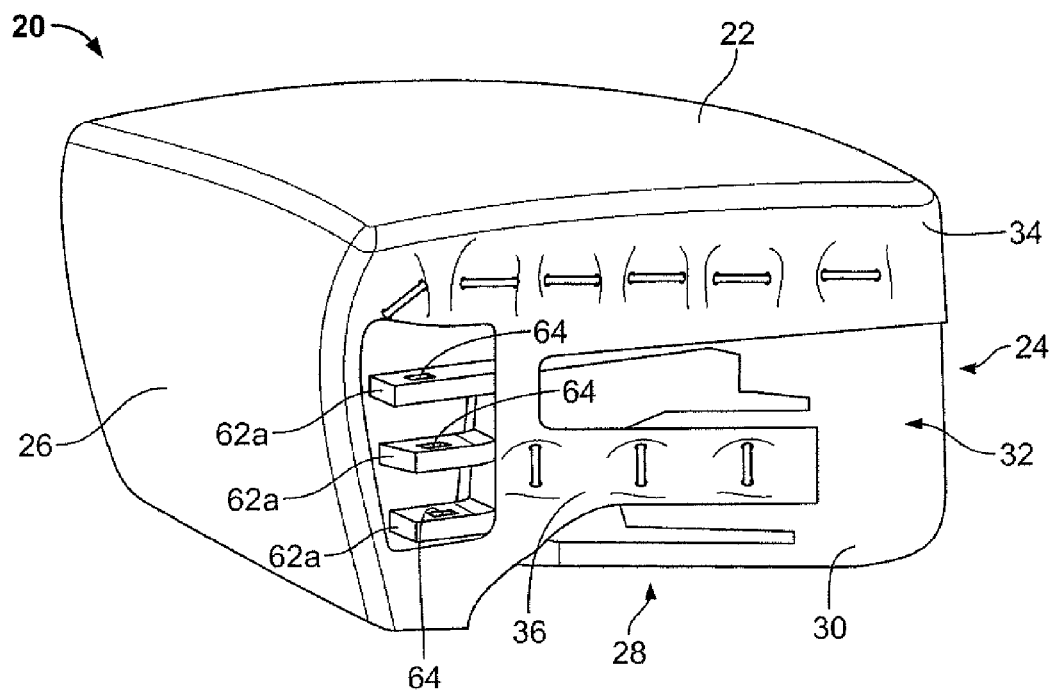
FIG. 10 is a fragmentary perspective view of an armrest unit that can be used in the armrest assembly of FIG. 5.

Various associated portions of armrest unit and/or pull-cup unit 40 can be configured to accommodate coupling 60 and its components during assembly of armrest and pull-cup assembly 16. As shown in FIG. 10, cover 34 of armrest unit 20 can be configured with at least one attachment extension 36 that extend around fins 62*a* that are attached with support member 32. As such, extension 36 can allow for cover 34 to be attached with support member 32 such that the portion thereof along inner surface 26 and extending into junction 38 can be secured without staples or the like along the edge adjacent inner surface 26, thereby reducing the amount of excess cover 34 material between fins 62 and inner surface 26. Such configuration can allow for coupling structure 60 to be positioned closer to inner surface 26 than would be possible in an armrest unit 20 incorporating a prior-art cover 34, as shown in FIG. 2. Further, pull-cup unit 40, for example, can be configured with a hard cover portion 56 (FIG. 5) that can be affixed with the remainder of pull-cup unit 40 after assembly of attachment member 66 into coupling structure 60 such that coupling structure 60 can be concealed within the finished assembly 16. The portions of assembly 16 in the area of coupling structure 60 can be modified in other ways to permit assembly of coupling structure and can be done so in a way that is at least somewhat concealed from view, including the incorporation of a hole or the like open to lower surface 48 of pull-cup unit 40 through which attachment member 66 can be inserted.

It will be understood by one having ordinary skill in the art that construction of the described invention and other components is not limited to any specific material. Other exemplary embodiments of the invention disclosed herein may be formed from a wide variety of materials, unless described otherwise herein.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A door trim assembly, comprising:
   an armrest;
   a pull-cup unit; and
   a coupling structure including a first portion having a first fin, a second portion having two second fins on opposing sides of the first fin, and an attachment member engaged with the at least one first fin and the at least two second fins;
   wherein the first and second portions are respectively affixed to one each of the armrest and the pull-cup unit.

2. The door trim assembly of claim 1, wherein the armrest and pull-cup unit each include respective structural bodies, and wherein first and second portions of the coupling structure are respectively affixed to the one each of the armrest or the pull-cup unit by being integrally formed with the respective structural bodies.

3. The door trim assembly of claim 2, wherein the structural bodies of the armrest and pull-cup unit and the first and second portions of the coupling structure comprise plastic.

4. The door trim assembly of claim 1, wherein the attachment member is engaged with the first fin and the two second fins so as to pivotably couple the first and second portions of the coupling structure.

5. The door trim assembly of claim 1, further including an interior door substrate, and wherein the armrest and the pull-cup unit are respectively affixed to the interior door substrate so as to extend away therefrom.

6. The door trim assembly of claim 5, wherein the armrest and pull-cup unit each extend generally parallel to the interior substrate in a first lateral direction, and wherein the first fin and two second fins extend respectively from the armrest and pull-cup unit in a second direction parallel to the first direction.

7. The door trim assembly of claim 6, wherein the attachment member extends in a third direction generally parallel to the interior door substrate and generally perpendicular to the first direction.

8. The door trim assembly of claim 5, wherein the armrest and the pull-cup unit define respective inner surfaces spaced apart from the interior door substrate, the attachment member being positioned closer to the inner surface of either the armrest or the pull-cup unit than to the interior door substrate.

9. The door trim assembly of claim 8, wherein the attachment member is positioned within 20 mm of the inner surface of the armrest or the pull-cup unit.

10. The door trim assembly of claim 1, wherein the first fin and the two second fins include respective holes therethrough, and wherein the attachment member is a bolt extending through the holes.

11. The door trim assembly of claim 10, wherein the bolt is threadibly engaged with one of the two second fins.

12. A vehicle door, comprising:
    a door interior substrate;
    an armrest including:
       a first body extending in a first direction away from the door interior substrate at a first distance and in a second direction along the door interior substrate; and
       a first coupling structure portion affixed with the first body;
    a pull-cup unit including:
       a second body extending in the first direction at a second distance and in the second direction; and
       a second coupling structure portion affixed with the second body; and
    an attachment member extending in a third direction perpendicular to the first and second directions so as to pivotably join the first coupling structure portion with the second coupling structure portion at a point disposed away from the door interior substrate by at least half of the first distance or the second distance.

13. The vehicle door of claim 12, wherein the first and second coupling structure portions together define at least three fins overlapping one another in the third direction, each of the fins being affixed with one of the first body and the second body in an alternating configuration.

14. The vehicle door of claim 13, wherein the fins have respective thicknesses in the third direction, each thickness being between 1.5 mm and 4 mm.

15. The vehicle door of claim 12, wherein the armrest further includes a cover over at least a portion of the first body, the cover including an attachment extension between a portion of the first body and a portion of the second body, the attachment extension extending at least partially around the first coupling structure portion.

16. The vehicle door of claim 12, wherein the first coupling structure portion and at least a portion of the first body are of a single piece of molded plastic, and wherein the second coupling structure portion and at least a portion of the second body are of a single piece comprising molded plastic.

17. A vehicle door component assembly, comprising:
    first and second bodies, each including an inboard face and an outboard face having at least one attachment feature thereon, the first body and the second body defining a junction therebetween; and
    a coupling structure affixed between the first and second bodies and defining a pivot axis within the junction, generally parallel to the outboard face, and positioned closer to the inboard faces than to the outboard faces of the first and second bodies, the coupling structure joining the first and second bodies to one another so as to be rotatable with respect to each other about the pivot axis.

18. The vehicle door component assembly of claim 17, wherein the coupling structure includes at least three flanges overlapping in a direction of the pivot axis, each of the flanges being affixed with one of first body and the second body in an alternating configuration, the coupling structure further including an attachment member engaged with the at least three flanges.

19. The vehicle door component assembly of claim 18, wherein the three flanges include respective holes therethrough, and wherein the attachment member is a bolt extending through the holes.

20. A vehicle door, comprising:
   a door interior substrate; and
   the vehicle door component assembly of claim 18, wherein the first and second bodies are affixed to the door interior substrate at least in part by the attachment features of the first and second bodies such that the junction therebetween is substantially flush.

* * * * *